(12) United States Patent
Hirano et al.

(10) Patent No.: US 11,420,502 B1
(45) Date of Patent: Aug. 23, 2022

(54) DOOR STRUCTURE

(71) Applicant: HONDA MOTOR CO., LTD., Tokyo (JP)

(72) Inventors: Eiji Hirano, Wako (JP); Takayuki Soma, Wako (JP); Masahiro Tanigawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/184,853

(22) Filed: Feb. 25, 2021

(51) Int. Cl.
*B60J 5/04* (2006.01)
*B62D 25/04* (2006.01)
*B62D 21/15* (2006.01)

(52) U.S. Cl.
CPC ............ *B60J 5/042* (2013.01); *B62D 21/152* (2013.01); *B62D 25/04* (2013.01)

(58) Field of Classification Search
CPC .......... B62D 21/152; B62D 25/04; B60J 7/04; B60J 7/042; B60J 7/0423; B60J 7/0431; B60J 5/04; B60J 5/042; B60J 5/0423; B60J 5/0431
USPC ........... 296/146.5, 146.6, 202, 187.09, 187.1
See application file for complete search history.

(56) References Cited

U.S. PATENT DOCUMENTS

| | | | | |
|---|---|---|---|---|
| 2,765,648 A * | 10/1956 | Hatcher | .............. | E05B 47/0603 292/144 |
| 3,289,782 A * | 12/1966 | Price | ............ | E05B 77/54 180/289 |
| 3,468,392 A * | 9/1969 | Hass | ............ | E05B 77/12 180/281 |
| 3,830,332 A * | 8/1974 | Fontaine | .............. | E05B 77/50 180/281 |
| 5,224,752 A * | 7/1993 | Marshall | .............. | B60J 5/0458 292/144 |
| 5,386,713 A * | 2/1995 | Wilson | .............. | E05B 85/22 292/144 |
| 6,312,045 B2 * | 11/2001 | Kitagawa | .............. | B62D 25/04 292/25 |
| 6,601,910 B1 * | 8/2003 | Duggan | .............. | B62D 25/08 296/203.03 |
| 6,830,285 B2 * | 12/2004 | Guillez | .............. | B60J 5/0459 296/187.12 |
| 7,311,169 B1 * | 12/2007 | Caliskan | .............. | E05B 77/12 296/68.1 |
| 7,992,925 B2 * | 8/2011 | Lagrut | .............. | B60J 5/0459 296/146.13 |
| 8,087,714 B2 * | 1/2012 | Rouhana | .............. | B60J 5/042 296/187.12 |

(Continued)

FOREIGN PATENT DOCUMENTS

DE 10117535 A1 * 10/2002 ............ B60J 5/0425
DE 10128864 B4 * 6/2013 ............ B60J 5/0458

(Continued)

*Primary Examiner* — Dennis H Pedder
(74) *Attorney, Agent, or Firm* — Rankin, Hill & Clark LLP

(57) ABSTRACT

A door structure includes a safety device arranged on a surface of the door structure facing a pillar of a vehicle body, wherein the safety device includes: a case member having an opening which opens to the pillar; a slide pin configured to slide from an initial position to a protruded position, in a direction from the case member toward the pillar; and a stopper configured to fix the slide pin in the protruded position when the slide pin has slid to the protruded position.

6 Claims, 4 Drawing Sheets

(56) References Cited

U.S. PATENT DOCUMENTS 9,168,884 B2 * 10/2015 Horner .................. B60R 21/013
2012/0049580 A1 * 3/2012 Konchan ................ B60J 5/0479
296/202

FOREIGN PATENT DOCUMENTS

| DE | 102016203339 | * | 9/2017 | |
|----|---|---|---|---|
| EP | 2 127 954 A1 | | 12/2009 | |
| JP | 2004268805 A | * | 9/2004 | |
| JP | 2009-286390 A | | 12/2009 | |
| WO | WO-9718965 A1 | * | 5/1997 | ............ B60J 5/0447 |

* cited by examiner

DOOR STRUCTURE

TECHNICAL FIELD

The present disclosure relates to a door structure.

BACKGROUND

There is a conventional door structure for a vehicle including elongated airbags arranged in gaps between pillars and doors (see Patent document 1, for example). In the door structure, the airbags are inflated with a signal outputted from a designated sensor at the time of collision.

According to the door structure described above, an input load at the time of collision is transmitted from the pillars to the door structure, via the airbags which have been inflated at the time of collision, and structural members behind the doors. With this door structure, the doors themselves are used as a load path (load transmission member) at the time of collision.

Patent document 1: Japanese Patent Application Publication No. 2009-286390

However, the conventional door structure (see Patent document 1, for example) has a problem that the number of components of safety devices including sensors, airbags, and gas supplying parts to the airbags is increased to make the door structure complicated.

The present disclosure is intended to provide a door structure including safety devices more simplified than a conventional door structure.

SUMMARY OF THE DISCLOSURE

An aspect of the present disclosure provides a door structure including a safety device arranged on a surface of the door structure facing a pillar of a vehicle body, wherein the safety device includes: a case member having an opening which opens to the pillar; a slide pin configured to slide from an initial position to a protruded position, in a direction from the case member toward the pillar; and a stopper configured to fix the slide pin in the protruded position when the slide pin has slid to the protruded position.

The present disclosure provides a door structure including safety devices more simplified than a conventional door structure.

DETAILED DESCRIPTION OF THE PREFERRED EMBODIMENTS

A description is given in detail of a door structure of an embodiment of the present disclosure.

The embodiment describes only a door structure on a left side of bisymmetric door structures respectively applied to a right and left side doors of a vehicle.

In the following description, a longitudinal direction, a vertical direction, and a width direction correspond to a front-rear direction, an up-down direction, and a right-left direction of the vehicle.

Figure 1:
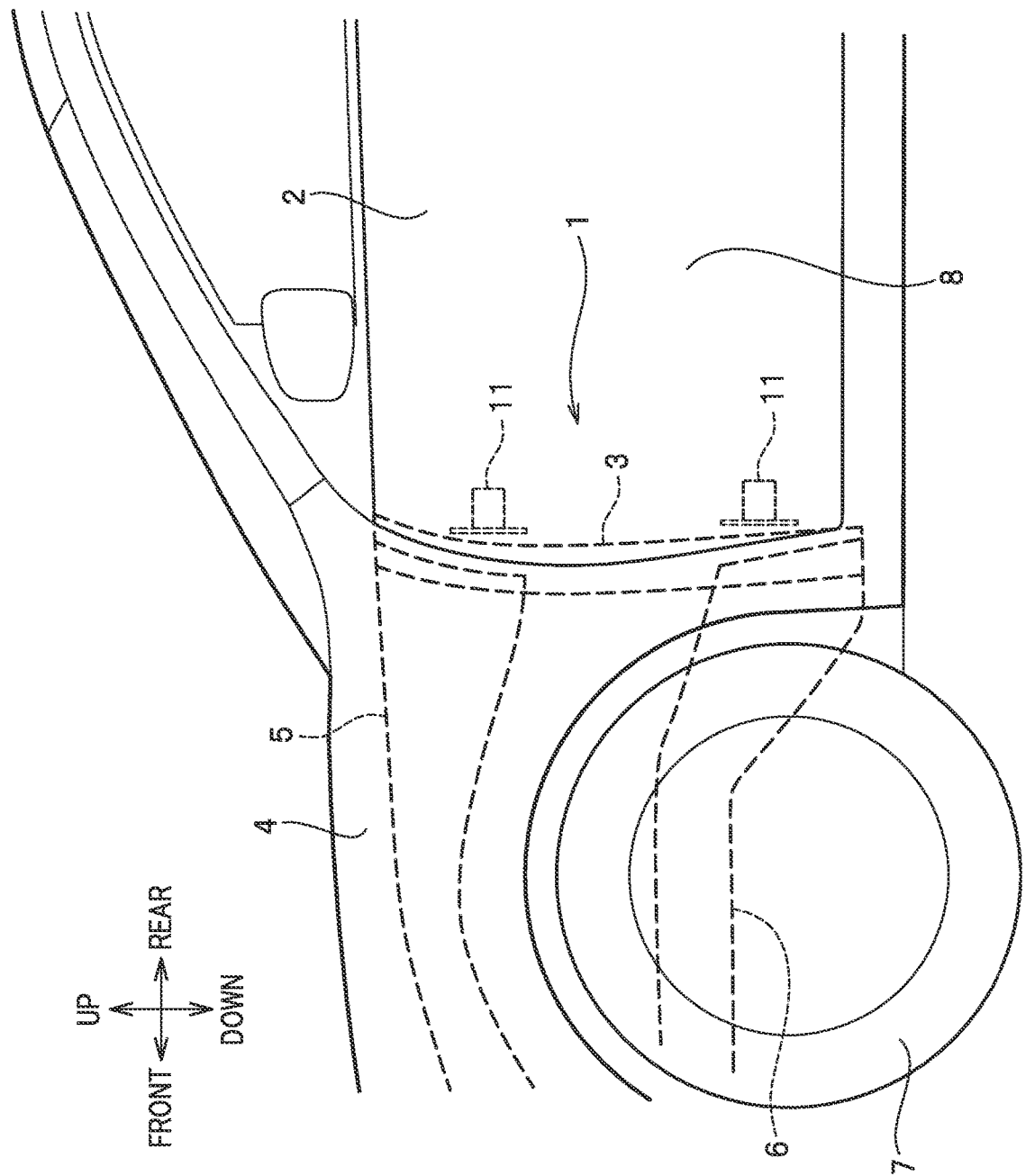
FIG. 1 is a partially enlarged side view of a vehicle including a door structure according to an embodiment of the present disclosure.

FIG. 1 is a partially enlarged side view on the left side of the vehicle including a door structure 1 according to the embodiment of the present disclosure.

As illustrated in FIG. 1, the door structure 1 includes safety devices 11 at a front portion of a side door 2. The safety devices 11 are indicated by hidden (dotted) lines in FIG. 1.

Each safety device 11 is arranged to face a gap between an inner panel (not illustrated) of the side door 2 and a front pillar (A-pillar) 3. The front pillar 3 extends vertically inside in a width direction of the vehicle along a joint (boundary) between an outer panel (door skin) 8 of the side door 2 and a fender panel 4, as indicated by a hidden (dotted) line in FIG. 1.

A pair of the safety devices 11 are arranged in line in the vertical direction along a front edge of the side door 2, as illustrated in a lateral view of a vehicle body in FIG. 1.

The safety device 11 on an upper side of the pair of safety devices 11 is arranged at a position corresponding to a rear portion of an upper member 5. Further, the safety device 11 on a lower side of the pair of safety devices 11 is arranged at a position corresponding to a rear portion of a front side frame 6 and a wheel 7.

The upper member 5 and the front side frame 6 transmit an input load at the time of collision to a rear of the vehicle via a front bumper beam (not illustrated). The upper member 5, the front side frame 6, and the wheel 7 constitute a "load input member" as described in the appended claims. The upper member 5 and the front side frame 6 are indicated by hidden lines (dotted lines) in FIG. 1.

Figure 2:
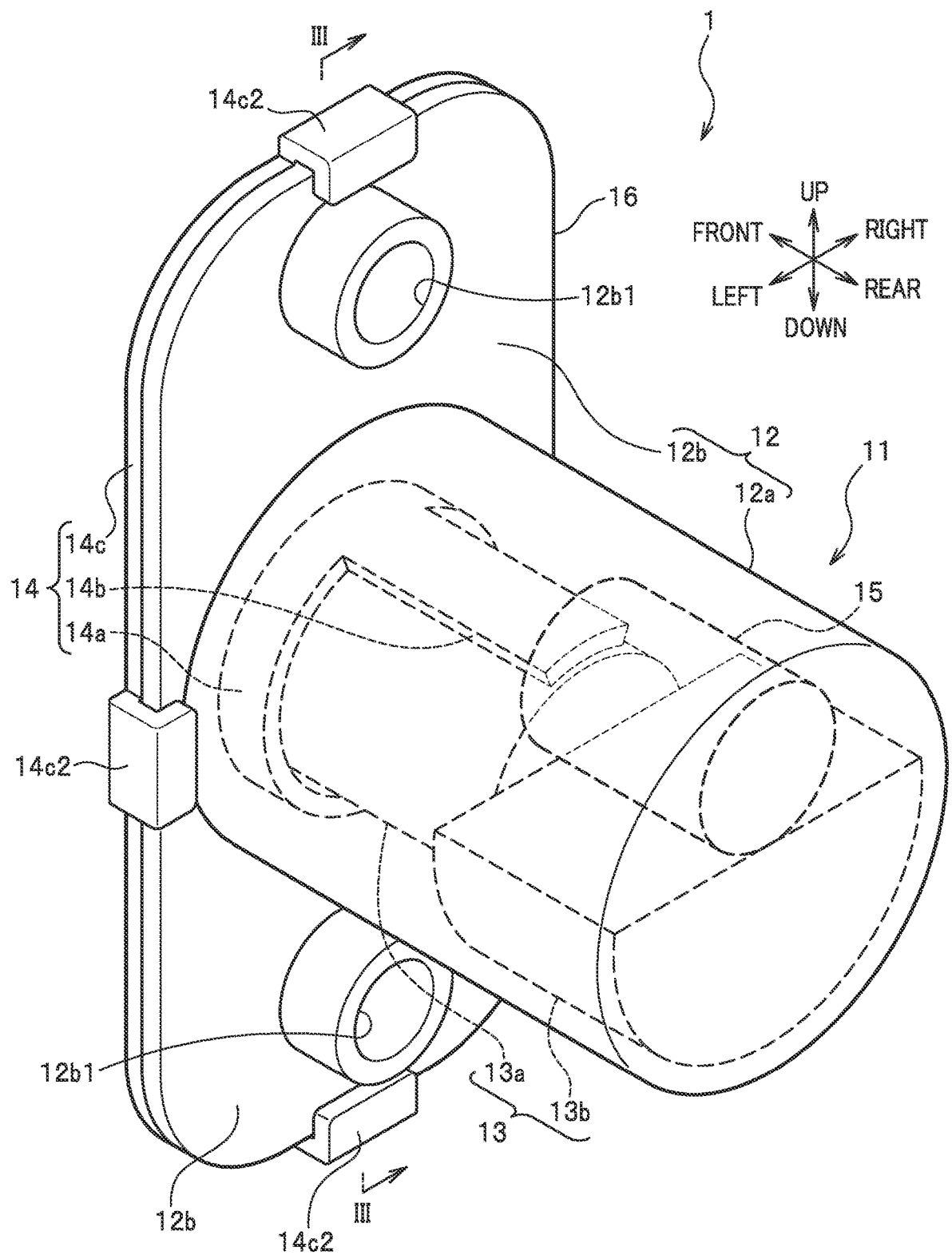
FIG. 2 is an overall perspective view of a safety device shown in FIG. 1.
Figure 3:
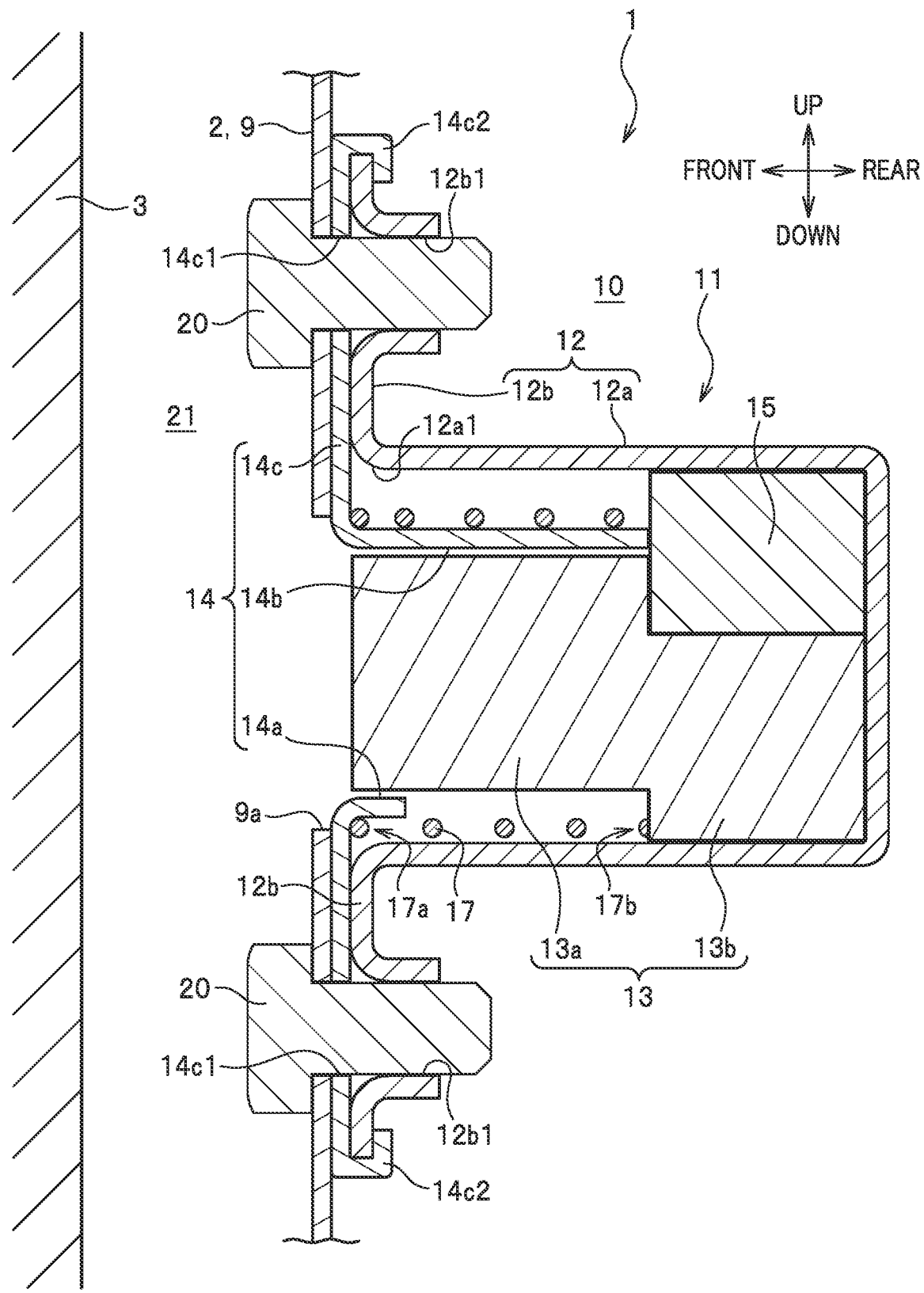
FIG. 3 is a cross-sectional view of a slide pin of the safety device in an initial position, taken along a line III-III in FIG. 2.

FIG. 2 is an overall perspective view of the safety device 11 illustrated in FIG. 1. FIG. 3 is a cross-sectional view taken along a line III-III in FIG. 2.

As illustrated in FIG. 2, the safety device 11 has a main outer shape which is formed by a case body 12a to be described below, having a bottomed cylindrical body in which a slide pin 13 described below and the like are accommodated, and a fixing plate 16 with which the safety device 11 is attached to the side door 2 (see FIG. 1).

As illustrated in FIG. 3, the safety device 11 is attached to a rear surface of an inner panel 9 of the side door 2 facing the front pillar 3 in the longitudinal direction. That is, the safety device 11 is arranged in a door hollow portion 10 defined between the outer panel 8 (see FIG. 1) of the side door 2 and the inner panel 9. The inner panel 9 attached with the safety device 11 has a protrusion hole 9a through which a protrusion 13a of the slide pin 13, to be described below, of the safety device 11 protrudes.

As illustrated in FIGS. 2 and 3, the safety device 11 includes a case member 12, the slide pin 13, a stopper 15 for the slide pin 13, a guide member 14, and a coil spring 17 (see FIG. 3) as a biasing member to bias the slide pin 13 rearward.

As illustrated in FIGS. 2 and 3, the case member 12 includes the case body 12a described above and flanges 12b.

The case body 12a is arranged on the rear surface of the inner panel 9 such that an opening 12a1 of the case body 12a corresponds to the protrusion hole 9a of the inner panel 9.

The slide pin 13, the stopper 15, a portion of the guide member 14, and the coil spring 17 described above are accommodated inside the case body 12a.

As illustrated in FIGS. 2 and 3, the flanges 12b are formed of a pair of elongated plates respectively extending on an upper side and a lower side of the center of the case body 12a.

The flanges 12b each have a bolt insertion hole 12b1 in which a thread is formed to engage with a bolt 20 (see FIG. 3) to be described below.

As illustrated in FIG. 2, each of the flanges 12b is overlaid with a flange 14c of the guide member 14 to be described below so as to form the fixing plate 16 of the safety device 11.

As illustrated in FIG. 3, the slide pin 13 includes the protrusion 13a arranged at a front in the case body 12a and a pin body 13b arranged at a rear in the case body 12a. Note that FIG. 3 illustrates the slide pin 13 in an initial position before being protruded.

As illustrated in FIG. 2, the protrusion 13a has a cylindrical shape. As shown in FIG. 3, the protrusion 13a has an outer diameter smaller than an inner diameter of the protrusion hole 9a so as to be protruded through the protrusion hole 9a of the inner panel 9.

As illustrated in FIG. 2, the pin body 13b integrally formed with the protrusion 13a has a substantially semi-cylindrical shape. Specifically, the pin body 13b has a substantially semi-cylindrical shape, in which an upper portion of a cylindrical body having substantially the same diameter as the inner diameter of the case body 12a is partially removed, so that the pin body 13b is accommodated in a cylindrical space in the case body 12a to become slidable in the longitudinal direction.

The pin body 13b has a larger volume than the protrusion 13a to gain mass so as to contribute to an increase in the inertial force IF (see FIG. 4) of the slide pin 13 at the time of a collision, as described below.

As described below, the stopper 15 is a member to stop the slide pin 13 so as to maintain the protrusion 13a protruded through the protrusion hole 9a (see FIG. 3) when the slide pin 13 has slid forward due to the inertial force IF (see FIG. 4) at the time of a collision.

As illustrated in FIG. 2, the stopper 15 has a cylindrical shape. The stopper 15 is arranged such that an axis thereof is oriented in the longitudinal direction in the case body 12a.

Further, a diameter and a length in the longitudinal direction of the stopper 15 are defined to be accommodated on the pin body 13b in the case body 12a.

Still further, the length of the stopper 15 in the longitudinal direction is defined to be shorter than the maximum length by which the pin body 13b is movable in the longitudinal direction in the case body 12a.

As illustrated in FIGS. 2 and 3, the guide member 14 includes a collar 14a, a guide plate 14b, and the flange 14c.

The collar 14a has a cylindrical shape through which the protrusion 13a of the slide pin 13 is inserted. The guide plate 14b is an elongated plate extending rearward from the collar 14a along a peripheral surface of the protrusion 13a. A surface of the guide plate 14b facing the protrusion 13a is curved in accordance with a curvature of an outer peripheral surface of the protrusion 13a.

Further, a length in the longitudinal direction of the guide plate 14b is defined to be substantially the same as a length in the longitudinal direction of the protrusion 13a. At the time of a collision, when the forward inertial force is given to the stopper 15A, a rear end of the guide plate 14b comes in contact with the stopper 15, to prevent the stopper 15 from moving.

The flange 14c has substantially the same planar shape as the flanges 12b of the case member 12.

Further, the flange 14c has bolt insertion holes 14c1 (see FIG. 3) at positions corresponding to the bolt insertion holes 12b1 of the flanges 12b.

Still further, the flange 14c includes clamped pieces 14c2 at an upper edge, a lower edge, a right edge, and a left edge, respectively.

The flanges 12b of the case member 12 overlaid with the flange 14c are clamped by the clamped pieces 14c2. The flanges 12b and the flange 14c integrated by the clamped pieces 14c2 form the fixing plate 16 (see FIG. 1) of the safety device 11.

As illustrated in FIG. 3, the coil spring 17 is arranged around the protrusion 13a of the slide pin 13. A spring seat 17a at a front of the coil spring 17 is arranged at a corner between the collar 14a and the flange 14c of the guide member 14.

Further, a spring seat 17b at a rear of the coil spring 17 is arranged on a front surface of the pin body 13b of the slide pin 13.

This causes the coil spring 17 to bias the slide pin 13 rearward by an elastic force thereof.

As illustrated in FIG. 3, the bolts 20 inserted into the holes formed in the inner panel 9 are engaged with the threads of the bolt insertion holes 12b1 formed in the flanges 12b of the case member 12 to fix the safety device 11 as described above to the inner panel 9.

This causes the safety device 11 to be arranged in the door hollow portion 10 and causes a front end of the slide pin 13 to face a gap 21 between the front pillar 3 and the side door 2 (a surface facing the front pillar 3) through the protrusion hole 9a formed in the inner panel 9.

Advantageous Effects

Next, a description is given of operation of the door structure 1 according to the present embodiment at the time of collision and advantageous effects of the door structure 1.

Figure 4:
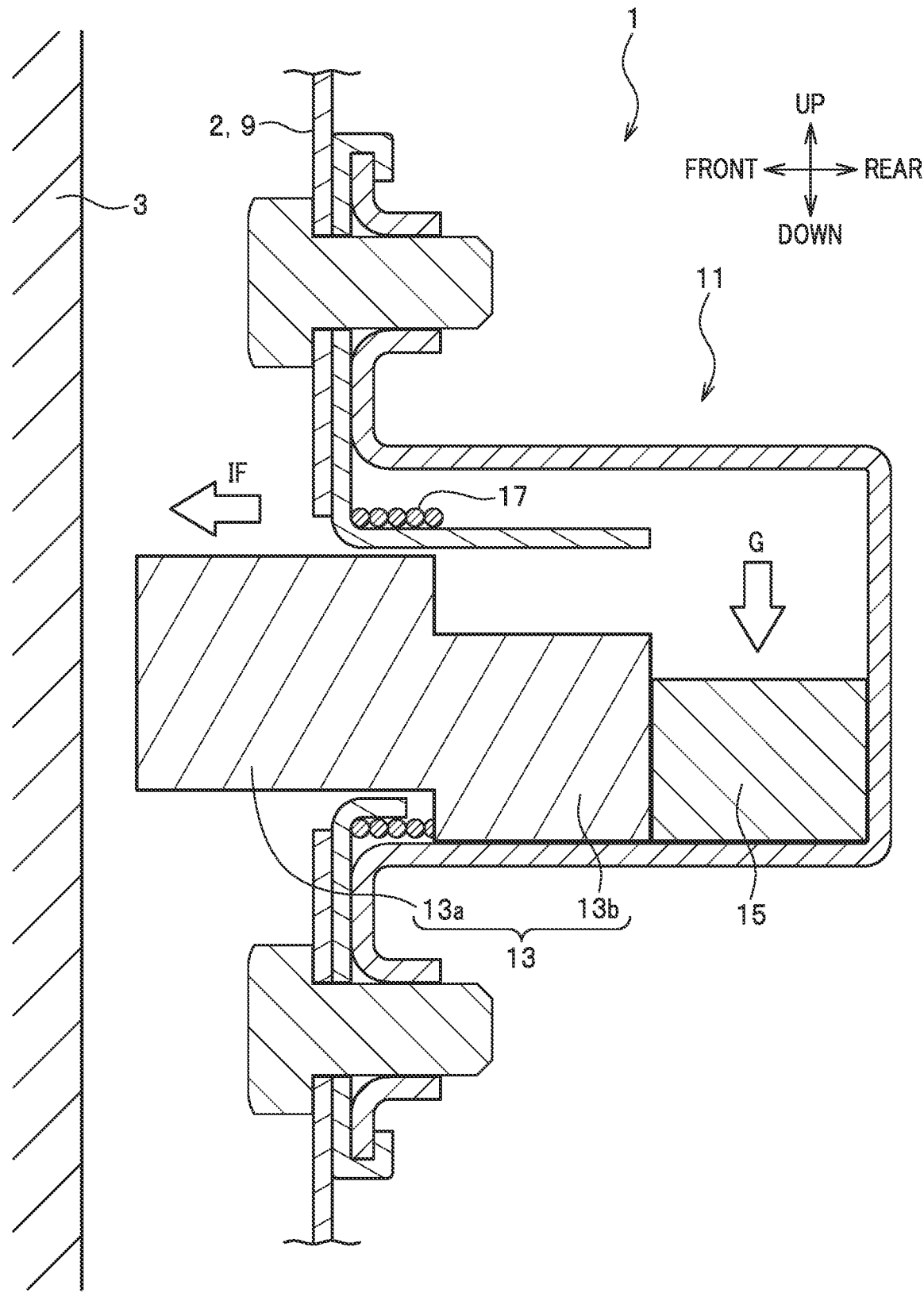
FIG. 4 is a cross-sectional view of the slide pin of the safety device in a protruded position, in contrast with FIG. 3.

FIG. 4 illustrates the slide pin 13 in a protruded position, in contrast to FIG. 3 illustrating the initial position of the slide pin 13.

As illustrated in FIG. 4, when the inertial force IF is applied to the slide pin 13 due to an impact from ahead, the slide pin 13 of the safety device 11 of the door structure 1 of the present embodiment moves toward the front pillar 3 against a biasing force of the coil spring 17.

The stopper 15 fixes the slide pin 13 in the protruded position.

The front end of the slide pin 13 fixed in the protruded position illustrated in FIG. 4 approaches the front pillar 3. The side door 2 (inner panel 9) with the door structure 1 serves as a load path (load transmission member) though which a collision load transmitted to the front pillar 3 is further transmitted rearward through the safety device 11 (slide pin 13).

The safety device 11 of the door structure 1 of the present embodiment has a simple structure with use of the inertial force, which is different from a safety device of a conventional door structure (see Patent document 1, for example) having sensors, airbags, and the like.

According to the door structure 1 described above, the number of components and manufacturing costs are reduced as compared with a conventional door structure.

Further, the door structure 1 of the present embodiment does not have components such as airbags, which could come into view, to be exposed between side doors and front pillars, unlike a conventional door structure (see Patent document 1, for example). The door structure 1 of the present embodiment does not spoil appearance due to exposure of components coming into view.

Further, the slide pin 13 of the door structure is biased toward the initial position by the biasing member. This prevents the slide pin 13 of the door structure 1 from inadvertently protruding toward the front pillar 3 at the time of normal opening/closing operation of the side door 2.

Further, the slide pin 13 of the door structure 1 slides along the guide member 14 (guide plate 14*b*) at the time of sliding from the initial position illustrated in FIG. 3 to the protruded position illustrated in FIG. 4.

The slide pin 13 of the door structure 1 is more reliably protruded toward the front pillar 3 by the guide member 14 (guide plate 14*b*).

Further, at the time of collision, when the forward inertial force is applied to the stopper 15, the guide plate 14*b* of the door structure 1 comes in contact with the stopper 15, to prevent the stopper 15 from moving forward.

As illustrated in FIG. 4, at the time of collision, only the slide pin 13 slides forward. The slide pin 13 is prevented from interfering with the stopper 15 in the vertical direction, so that the stopper 15 is more reliably positioned behind the slide pin 13. This allows the slide pin 13 to be more reliably fixed in the protruded position by the stopper 15.

Further, the safety devices 11 of the door structure 1 are arranged behind load input members such as the upper members 5 which are given with a relatively large input load at the time of collision. In the door structure described above, the side door 2 functions more effectively as a load path (load transmission member).

Further, the safety device 11 of the door structure 1 is fixed at positions on an upper side and a lower side of the slide pin 13, so that the safety device 11 is strongly supported against an external force acting around an axis of the slide pin 13.

Further, the safety device 11 is fixed at positions on the upper side and the lower side of the slide pin 13, so that a degree of freedom in design for mounting the safety device 11 to the inner panel 9, which is a surface facing the front pillar 3 extending vertically, is improved.

As described above, the embodiment of the present disclosure has been described, but the present disclosure is not limited thereto and may be implemented in various forms.

The stopper 15 of the door structure 1 in the above embodiment is assumed to move behind the slide pin 13 due to free fall with gravity G (see FIG. 4) when the slide pin slides forward. However, the door structure 1 may include a biasing member such as a snap spring above the stopper 15 for biasing the stopper 15 downward.

What is claimed is:

1. A door structure comprising:
   a safety device arranged on a surface of a door facing a pillar of a vehicle body,
   wherein the safety device includes:
   a case member having an opening which opens toward the pillar and is fixed to the door;
   a slide pin configured to slide from an initial position to a protruded position which is located in front of the initial position, in a direction from the case member toward the pillar; and
   a stopper within the case member slidable against a rear surface of the slide pin to fix the slide pin in the protruded position when the slide pin has slid to the protruded position.

2. The door structure as claimed in claim 1, wherein the safety device includes a biasing member to bias the slide pin toward the initial position.

3. The door structure as claimed in claim 1, wherein the safety device includes a guide member extending in a sliding direction of the slide pin in the case member.

4. The door structure as claimed in claim 3, wherein the stopper is arranged on the slide pin and is restricted to move in the sliding direction by the guide member.

5. The door structure as claimed in claim 1, wherein the safety device is arranged at a position corresponding to a load input member arranged on the vehicle body.

6. The door structure as claimed in claim 1, wherein the safety device is fixed to the door at positions on an upper side and a lower side of the slide pin.

\* \* \* \* \*